(12) United States Patent
Kim et al.

(10) Patent No.: US 7,781,050 B2
(45) Date of Patent: *Aug. 24, 2010

(54) ULTRATHIN POLYMER FILM USING CUCURBITURIL DERIVATIVE AND METHOD OF FORMING THE SAME

(75) Inventors: Kimoon Kim, Pohang (KR); Woo Sung Jeon, Pohang (KR); Dongwoo Kim, Pohang (KR); Dong Hyun Oh, Pohang (KR); Sang Yong Jon, Pohang (KR)

(73) Assignee: Postech Academy-Industry Foundation, Pohang (KR)

( * ) Notice: Subject to any disclaimer, the term of this patent is extended or adjusted under 35 U.S.C. 154(b) by 611 days.

This patent is subject to a terminal disclaimer.

(21) Appl. No.: 11/587,046

(22) PCT Filed: Apr. 21, 2005

(86) PCT No.: PCT/KR2005/001141
§ 371 (c)(1),
(2), (4) Date: Oct. 20, 2006

(87) PCT Pub. No.: WO2005/103125
PCT Pub. Date: Nov. 3, 2005

(65) Prior Publication Data
US 2007/0224403 A1    Sep. 27, 2007

(30) Foreign Application Priority Data
Apr. 21, 2004    (KR) .................. 10-2004-0027576

(51) Int. Cl.
C08J 5/22 (2006.01)
B32B 27/32 (2006.01)
(52) U.S. Cl. ............. 428/220; 428/457; 428/446; 428/411.1; 528/271; 528/367; 528/390; 540/472; 540/457; 540/460; 977/882; 977/883; 977/897

(58) Field of Classification Search ......... 528/220–223, 528/271, 367, 390; 428/457, 446, 411.1, 428/220; 540/472, 457, 460; 977/882–883, 977/897
See application file for complete search history.

(56) References Cited

U.S. PATENT DOCUMENTS 5,686,549 A * 11/1997 Grainger et al. ............... 528/25

(Continued)

FOREIGN PATENT DOCUMENTS

KR    1020010039662 A    5/2001

(Continued)

OTHER PUBLICATIONS

Holder et al. "Lamellar Organic Thin Films through Self-Assembly and Molecular Recognition". J. Org. Chem., 2001, 66 (2), pp. 391-399.*

(Continued)

*Primary Examiner*—Patricia L. Nordmeyer
*Assistant Examiner*—Prashant J Khatri
(74) *Attorney, Agent, or Firm*—Rothwell, Figg, Ernst & Manbeck, pc (57) ABSTRACT

Provided are an ultrathin polymer film formed by homopolymerization or copolymerization of a cucurbituril derivative with an organic monomer and a method of forming the same. The ultrathin polymer film has a thickness of 10 nm or less, and can retain its film shape even after being separated from a substrate.

18 Claims, 3 Drawing Sheets

U.S. PATENT DOCUMENTS

2002/0133003 A1    9/2002    Kim et al.

FOREIGN PATENT DOCUMENTS

| KR | 1020030003901 A | 1/2003 |
| KR | 1020030024426 A | 3/2003 |
| KR | 1020030060053 A | 7/2003 |
| WO | 03024978 A1 | 3/2003 |

OTHER PUBLICATIONS

Gibson et al. "Polyrotaxanes by Free-Radical Polymerization of Acrylate and Methacrylate Monomers in the Presence of a Crown Ether". Journal of Polymer Science, Part A: Polymer Chemistry, (2001) vol. 39, 1978-1993.*

Jon et al. "Facile Synthesis of Cucurbit[n]uril Derivatives via Direct Functionalization: Expanding Utilization of Cucurbit[n]uril". J. Am. Chem. Soc., 2003, 125 (34), pp. 10186-10187.*

Strook, et al., "Synthesis of Free-Standing Quasi-Two-Dimensional Polymers", Langmuir, 2003, pp. 2466-2472, vol. 19.

Yoon, et al., "Surface-initiated, ring-opening polymerization of p-dioxanone from gold and silicon oxide surfaces", J. Mater. Chem., 2003, pp. 2910-2914, vol. 13.

Kim, et al., "A Pseudorotaxane on Gold: Formation of Self-Assembled Monolayers, Reversible Dethreading and Rethreading of the Ring, and Ion-Gating Behavior", Agnew. Chem. Int. Ed., 2003, pp. 2293-2296, vol. 42.

* cited by examiner

ULTRATHIN POLYMER FILM USING CUCURBITURIL DERIVATIVE AND METHOD OF FORMING THE SAME

CROSS REFERENCE TO RELATED APPLICATION

This application is a 35 U.S.C. §371 National Phase Entry Application from PCT/KR2005/001141, filed Apr. 21, 2005, and designating the United States.

BACKGROUND OF THE INVENTION

1. Field of the Invention

The present invention relates to an ultrathin polymer film using a cucurbituril derivative and a method of forming the same. More particularly, the present invention relates to an ultrathin polymer film formed by homopolymerization or copolymerization of a cucurbituril derivative with an organic monomer, and a method of forming the same.

2. Description of the Related Art

Generally, blown film extrusion, calendaring, and laminating techniques have been employed to produce polymer films. Polymer films thus produced have been widely used in various fields as anti-oxidation coatings, anti-smudgy coatings, UV shielding films, hydrophobic films, packing and adhesive films, etc.

In order for polymer films to be used as low dielectric films, etching resistant films, or biosensors for nanoscale semiconductor devices that have received much interest for recent years, the thickness of the polymer films must be controlled to a nano-size range. However, the above-described polymer film production techniques cannot provide polymer films with a nanoscale thickness.

In this regard, the scientific and practical interests in methods of forming polymer films with a nanoscale thickness have been increased and thus extensive studies have been carried out.

Currently known methods for producing polymer films with a nanoscale thickness can be largely divided into two groups: introduction of a polymer solution obtained by dissolving a polymer material in a solvent onto a substrate; and polymerization of monomers on a surface of a substrate.

According to the former methods, polymer films may be formed by dip-coating or spin-coating. However, these methods do not permit the polymer films to have a high crosslinkage and a sufficiently small thickness, i.e., about 100 nanometers or less.

On the other hand, polymer films produced by the latter methods are easily ruptured when separated from substrates and are difficult to be controlled to a nanoscale thickness.

Meanwhile, self-assembled monolayers generally refer to molecular assemblies formed by spontaneous adsorption of specific molecules on the surfaces of substrates. In particular, molecules constituting self-assembled monolayers enable the easy and uniform introduction of specific functional groups onto the surfaces of substrates due to their directionality. Therefore, self-assembled monolayers have been widely utilized in protection of substrates against chemical materials, or in detection and analysis of biological materials, such as proteins or DNAs, through appropriate selection of functional groups of molecules constituting the self-assembled monolayers.

Many attempts to produce various types of polymer films based on the above-described characteristics of self-assembled monolayers have been made for recent years. In particular, many researchers have attempted to produce ultrathin polymer films with a thickness of 5 nm or less by synthesizing molecules with UV-induced polymerizable functional groups, forming self-assembled monolayers on surfaces of substrates using the molecules, and exposing the self-assembled monolayers to UV light [J. Am. Chem. Soc. 1995, 117, 5212, Langmuir 2003, 19, 2466].

However, most currently available ultrathin polymer films cannot be separated from the surfaces of substrates. Even when the separation of ultrathin polymer films from the surfaces of substrates is possible, the ultrathin polymer films cannot retain their film shapes after the separation, which considerably restricts the application of the ultrathin polymer films.

SUMMARY OF THE INVENTION

The present invention provides an ultrathin polymer film using a cucurbituril derivative and a method of forming the same.

According to an aspect of the present invention, there is provided an ultrathin polymer film obtained by polymerization of a cucurbituril derivative represented by the following formula 1:

<Formula 1> wherein X is O, S, or NH; $A_1$ and $A_2$ are each independently OR, SR, or NHR where R is an unsubstituted or substituted alkenyl group of C2-C20 with an unsaturated bond end; and n is an integer from 4 to 20.

The C=X group of the cucurbituril derivative binds with Y of a substrate represented by the following formula 2:

<Formula 2> wherein M is Au, Ag, $SiO_2$, or SiOH;

X's are each independently S, $(CH_3O)_3$—Si—, $(CH_3CH_2)_3$—Si—, $SO_2$—, or $CO_2$—;

Ys are each independently an alkyl group of C2-C30 end-substituted by —$N^+(R')(R'')(R''')$ or —$N(R')(R'')$ where R', R'', and R''' are each independently hydrogen or an alkyl group of C1-C20.

According to another aspect of the present invention, there is provided an ultrathin polymer film obtained by copolymerization of a cucurbituril derivative represented by the following formula 1 and an organic monomer having a substituted or unsubstituted alkenyl group of C3-C30:

<Formula 1> wherein X is O, S, or NH; $A_1$ and $A_2$ are each independently OR, SR, or NHR where R is an unsubstituted or substituted alkenyl group of C2-C20 with an unsaturated bond end; and n is an integer from 4 to 20.

According to yet another aspect of the present invention, there is provided a method of forming an ultrathin polymer film, including:

(a) dissolving a cucurbituril derivative represented by the following formula 1 in an organic solvent to prepare a solution;
(b) immersing a substrate with a self-assembled layer in the solution; and
(c) polymerizing the resultant obtained by the step (b):

<Formula 1> wherein X is O, S, or NH; $A_1$ and $A_2$ are each independently OR, SR, or NHR where R is an unsubstituted or substituted alkenyl group of C2-C20 with an unsaturated bond end; and n is an integer from 4 to 20.

The method may further include immersing the substrate in a solution obtained by dissolving an organic monomer with a substituted or unsubstituted alkenyl group of C3-C30 in an organic solvent before operation (c).

Operation (c) may be performed in the presence of a polymerization catalyst.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in more detail.

The present invention provides an ultrathin polymer film using a cucurbituril derivative represented by the following formula 1 and a method of forming the same. The ultrathin polymer film is obtained by polymerization of the cucurbituril derivative.

A C═X group, e.g., a carbonyl group, of the cucurbituril derivative, binds with a carbonyl-reactive end functional group of a self-assembled monolayer on a substrate. The substrate may be a substrate represented by the following formula 2, and Y of the substrate binds with a carbonyl group of the cucurbituril derivative.

<Formula 1> wherein X is O, S, or NH; $A_1$ and $A_2$ are each independently OR, SR, or NHR where R is an unsubstituted or substituted alkenyl group of C2-C20 with an unsaturated bond end; and n is an integer from 4 to 20.

Examples of OR include allyloxy, acryloxy, and alkenyloxy, examples of SR includes allylsulfido, acrylsulfido, and alkenylsulfido, and examples of NHR include allylamine, acrylamine, and alkenylamine.

<Formula 2> wherein M is Au, Ag, $SiO_2$, or SiOH;

X's are each independently S, $(CH_3O)_3$—Si—, $(CH_3CH_2)_3$—Si—, $SO_2$—, or $CO_2$—;

Ys are each independently an alkyl group of C2-C30 end-substituted by —$N^+(R')(R'')(R''')$ or —$N(R')(R'')$ where R', R'', and R''' are each independently hydrogen or an alkyl group of C1-C20.

In the formula 2, examples of Y include alkyl ammonium, alkyl(monomethyl ammonium), alkyl(dimethyl ammonium), and alkyl(trimethyl ammonium).

In the substrate represented by the formula 2, molecules represented by X'—Y form a self-assembled monolayer on the substrate.

The thickness of an ultrathin polymer film formed according to the present invention is 50 nm or less, in particular 1 to 10 nm.

Cucurbituril derivatives are macrocyclic compounds having a strong interaction with various compounds due to the presence of hydrophilic and hydrophobic cavities. In particular, the cucurbituril derivatives have carbonyl groups on the entrance of the cavities, and thus exhibit a strong interaction with various ionic compounds and high polarity compounds by charge-polarity interactions, polarity-polarity interactions, or hydrogen bonds. In particular, it is known that an ammonium functional group strongly interacts with the cavities of the cucurbituril derivatives. Therefore, the cucurbituril derivatives have retention capacity for various compounds, for example, organic compounds such as gaseous compounds, aliphatic compounds, and aromatic compounds, insecticides, herbicides, amino acids, nucleic acids, ionic compounds, metal ions, or organic metal ions.

Examples of hydroxycucurbiturils and their parent cucurbiturils used as synthetic materials for the cucurbituril derivative of the formula 1 are disclosed together with their structural formulae and synthetic methods in Korean Patent Application Nos. 02-68362, 02-318, 01-57573, 01-39756, and 00-33026, filed by the present applicants, the disclosures of which are incorporated herein by reference in their entireties.

Figure 1:
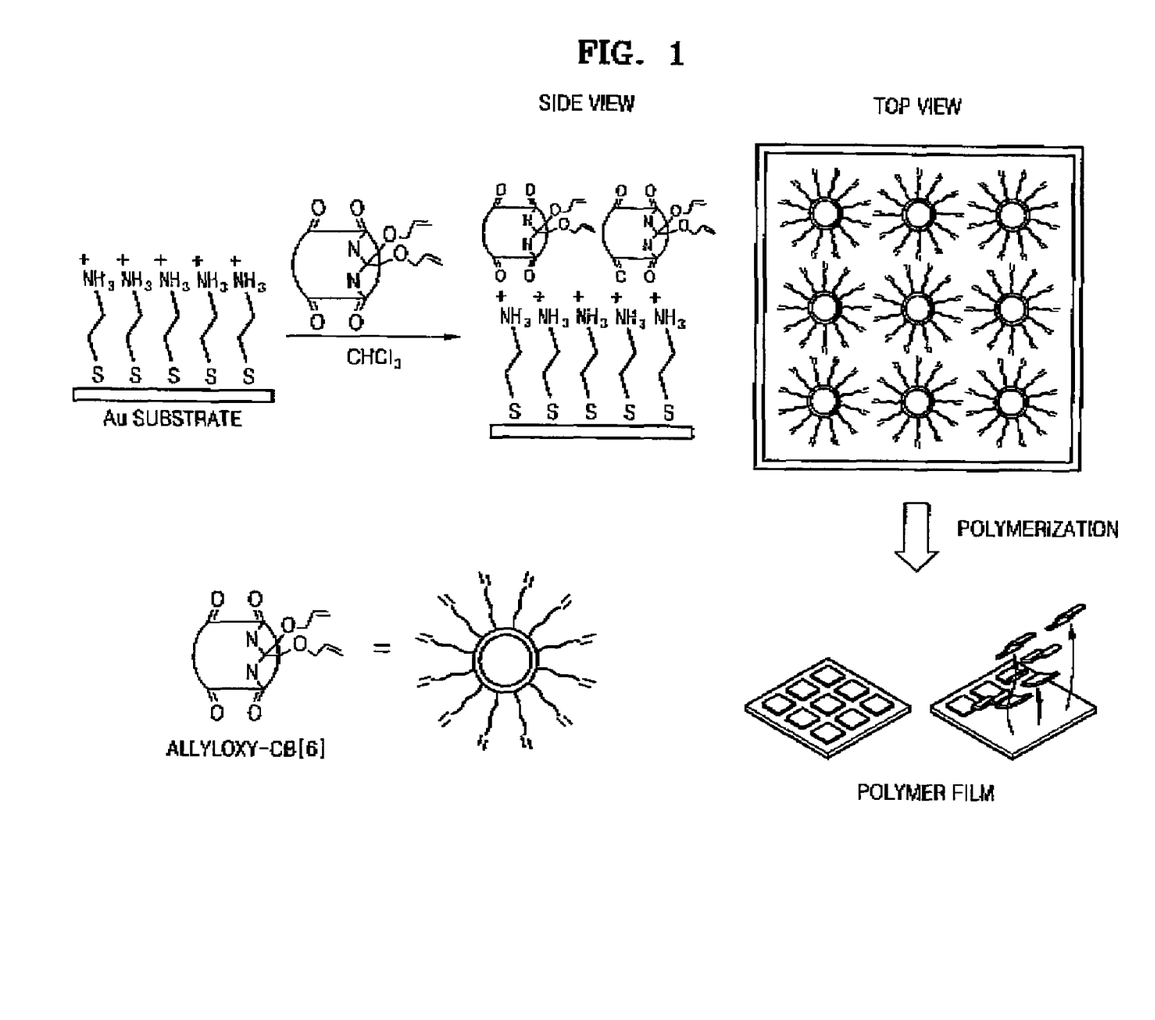
FIG. 1 is a diagram illustrating a process of forming an ultrathin polymer film according to an embodiment of the present invention.

FIG. 1 is a diagram illustrating a process of forming an ultrathin polymer film according to an embodiment of the present invention.

Referring to FIG. 1, an Au substrate is immersed in a chloroform solution containing allyloxycucurbit[6]uril, followed by polymerization and separation from the substrate to obtain an ultrathin polymer film according to the present invention.

The present invention also provides an ultrathin polymer film formed by copolymerization of a cucurbituril derivative and an organic monomer.

The organic monomer may be an organic monomer with a substituted or unsubstituted alkenyl end group of C3-C30. Examples of the organic monomer include, but are not limited to, styrene, acrylic acid, methacrylic acid, vinylpyrrolidinone, alkyl acrylate (e.g., methyl acrylate, ethyl acrylate), divinylbenzene, acrylamide, mixtures and combinations thereof.

The above-described ultrathin polymer films can be produced as follows.

First, a cucurbituril derivative represented by the formula 1 is dissolved in an organic solvent to prepare a solution. At this time, it is preferable to adjust the concentration of the solution to a range from 0.0001 to 0.1 M, in particular about 0.001 M.

The organic solvent may be a solvent capable of dissolving the cucurbituril derivative. For example, the organic solvent may be, but is not limited to, chloroform, dimethylsulfoxide, methanol, acetonitrile, or a combination thereof.

Next, a substrate with a self-assembled monolayer, which is represented by the formula 2, is immersed in the cucurbituril derivative-containing solution. Preferably, the time required for the immersing may be 20 hours or longer, in particular 20 to 200 hours.

Preferably, the substrate is washed several times with a organic solvent after being immersed in the solution for a predetermined time. At this time, the organic solvent may be the same organic solvent as used to dissolve the cucurbituril derivative.

The resultant substrate thus obtained is immersed in a mixture of a catalyst and a solvent for polymerization. During this polymerization reaction, unsaturated groups in the cucurbituril derivative are polymerized. For example, when allyloxycucurbituril is used as the cucurbituril derivative, polymerization of allyl groups occurs.

The temperature for the polymerization may vary according to the types of the catalyst and the cucurbituril derivative, but may be in the range from 10 to 40° C.

Preferably, the time required for immersing the substrate in the catalyst-containing mixture may be 60 hours or longer, in particular 60 to 600 hours. After the immersion, it is preferable to wash the substrate with an organic solvent. Here, the solvent mixed with the catalyst and the organic solvent for washing may be toluene, benzene, xylene, or the like.

The catalyst may be, but is not limited to, a Grubbs catalyst, a radical initiator, or a combination thereof.

Examples of the radical initiator include, but are not limited to, AIBN (2,2'-azobisisobuyronitrile), $K_2S_2O_8$, $(NH_4)_2S_2O_8$, benzoyl peroxide, and a combination thereof. When the radical initiator is used as the catalyst, the substrate is immersed in a catalyst solution, followed by UV irradiation for photopolymerization.

The catalyst is used in an amount of 0.01 to 10 moles based on 1 mole of the cucurbituril derivative. If the content of the catalyst is less than 0.01 moles, the polymerization may be retarded. On the other hand, if it exceeds 10 moles, removal of the catalyst from an ultrathin polymer film may be difficult.

Preferably, the concentration of the mixture of the catalyst and the solvent is in the range from 0.0001 to 0.1 M, in particular about 0.001 M.

The thickness of the ultrathin polymer film formed on the substrate can be measured using an ellipsometer.

Finally, a stripper is dropwise added onto the ultrathin polymer film formed on the substrate to separate the ultrathin polymer film from the substrate. Here, the stripper may be selected according to the type of an end functional group of the substrate. For example, the stripper may be an aqueous alkaline solution such as a 1N sodium hydroxide solution. The thus-separated ultrathin polymer film can be identified using a scanning electron microscope.

When an ultrathin polymer film according to the present invention is formed by copolymerization of a cucurbituril derivative represented by the formula 1 and an organic monomer with a substituted or unsubstituted alkenyl end group of C3-C30, the above-described method may further include immersing the substrate in a solution (A) obtained by dissolving the organic monomer in an organic solvent prior to the immersing the substrate in the catalyst-solvent mixture. At this time, there is no limitation to the organic solvent provided that it can dissolve the organic monomer. For example, chloroform or acetonitrile may be used. Preferably, the concentration of the solution (A) may be in the range from 0.0001 to 0.1 M, in particular about 0.001 M. Preferably, the time required for immersing the substrate in the solution (A) may be 20 hours or longer, in particular 20 to 200 hours.

The organic monomer with a substituted or unsubstituted alkenyl end group of C3-C30 may be used in an amount of 0.01 to 1,000 moles, preferably 1 to 120 moles based on 1 mole of the cucurbituril derivative of the formula 1. If the content of the organic monomer is outside the above range, effective synthesis of a copolymer may be difficult.

After being immersed in the organic monomer-containing solution, the substrate is preferably washed with the same pure organic solvent as used to dissolve the organic monomer.

Preferably, a copolymer obtained by copolymerization of a cucurbituril derivative represented by the formula 1 and an organic monomer with a substituted or unsubstituted alkenyl end group of C3-C30 may be represented by the following formula 3:

<Formula 3> wherein R is an alkyl group of C1-C20, an allyl group, or an aryl group of C6-C20, m is an integer from 1 to 10, and n is an integer from 10 to 1,000.

A polymer constituting an ultrathin polymer film according to the present invention has a weight average molecular weight of 20,000 to 2,000,000, and a degree of polymerization of 10 to 1,000.

Hereinafter, the present invention will be described more specifically with reference to the following examples. The following examples are for illustrative purposes and are not intended to limit the scope of the invention.

EXAMPLE 1

Figure 2:
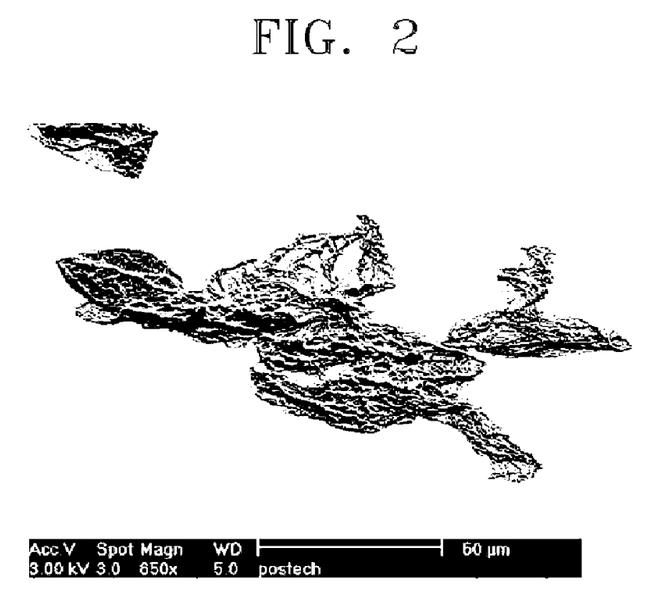
FIG. 2 is a scanning electron microscopic (SEM) image of an ultrathin polymer film obtained using allyloxycucurbit[6]uril according to Example 1 of the present invention.
Figure 3:
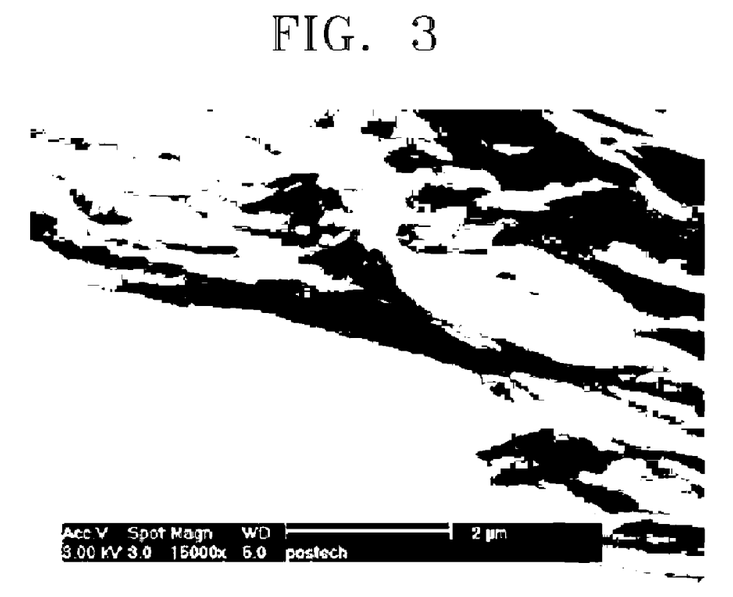
FIG. 3 is an enlarged SEM image of a region shown in FIG. 2.

Formation of Ultrathin Polymer Film by Polymerization of allyloxycucurbit[6]uril in the Presence of Grubbs Catalyst 20 mg of a cucurbituril derivative represented by the formula 1 where X is O, $A_1$ and $A_2$ are allyloxy, and n is 6 was dissolved in 10 ml of chloroform to prepare a cucurbituril derivative solution. A substrate (1 cm×2 cm in size) represented by the formula 2 where M is Au, X' is S, and Y is ethyl ammonium was immersed in the cucurbituril derivative solution for 20 hours. Then, the substrate washed three times with 10 ml of chloroform, dried in vacuum, and immersed for 60 hours in a solution obtained by dissolving 1 mg of a Grubbs catalyst in 10 ml of toluene. Then, the substrate washed three times with 10 ml of toluene. The examination of a thus-formed ultrathin polymer film using external reflection infrared spectroscopy showed that the ultrathin polymer film was composed of the cucurbituril derivative. Further, the thickness of the ultrathin polymer film measured using an ellipsometer was about 2 nm (±0.5 nm). The optical microscopic image and SEM image showed that the ultrathin polymer film can retain its film shape even after being separated from the substrate treated with a 1N sodium hydroxide solution (see FIGS. 2 and 3).

EXAMPLE 2

Formation of Ultrathin Polymer Film by Polymerization of allyloxycucurbit[6]uril in the Presence of Radical Initiator 20 mg of a cucurbituril derivative represented by the formula 1 where X is O, $A_1$ and $A_2$ are allyloxy, and n is 6 was dissolved in 10 ml of chloroform to prepare a cucurbituril derivative solution. A substrate (1 cm×2 cm in size) represented by the formula 2 where M is Au, X' is S, and Y is ethyl ammonium was immersed in the cucurbituril derivative solution for 20 hours. Then, the substrate washed three times with 10 ml of chloroform, dried in vacuum, immersed in a solution obtained by dissolving 1 mg of AIBN in 10 ml of toluene, and exposed to UV for 12 hours. Then, the substrate washed three times with 10 ml of toluene.

Figure 4:
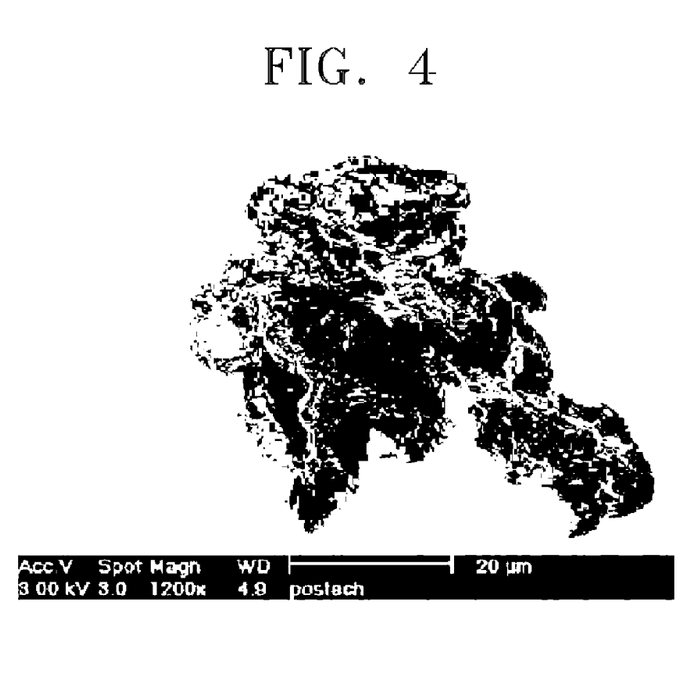
FIG. 4 is a SEM image of an ultrathin polymer film obtained using allyloxycucurbit[6]uril according to Example 2 of the present invention.

A 1N sodium hydroxide solution was dropwise added onto the resultant substrate to separate an ultrathin polymer film formed on the substrate. The ultrathin polymer film was identified using an optical microscope and a scanning electron microscope. The thickness of the ultrathin polymer film measured using an ellipsometer was about 2 nm (±0.5 nm). The optical microscopic image and SEM image showed that the ultrathin polymer film can retain its film shape even when being separated from the substrate treated with a 1N sodium hydroxide solution (see FIG. 4).

EXAMPLE 3

Formation of Ultrathin Polymer Film by Copolymerization of allyloxycucurbit[6]uril and Acrylic Acid

20 mg of a cucurbituril derivative represented by the formula 1 where X is O, $A_1$ and $A_2$ are allyloxy, and n is 6 was dissolved in 10 ml of chloroform to prepare a cucurbituril derivative solution. A substrate (1 cm×2 cm in size) represented by the formula 2 where M is Au, X' is S, and Y is ethyl ammonium was immersed in the cucurbituril derivative solution for 20 hours. The substrate washed three times with 10 ml of chloroform, dried in vacuum, and immersed for 30 hours in a 1M solution obtained by dissolving acrylic acid in chloroform. Then, the substrate washed three times with 10 ml of chloroform, dried in vacuum, immersed in a solution obtained by dissolving 1 mg of AIBN in 10 ml of toluene, and exposed to UV for 12 hours. Then, the substrate washed three times with 10 ml of toluene.

Figure 5:
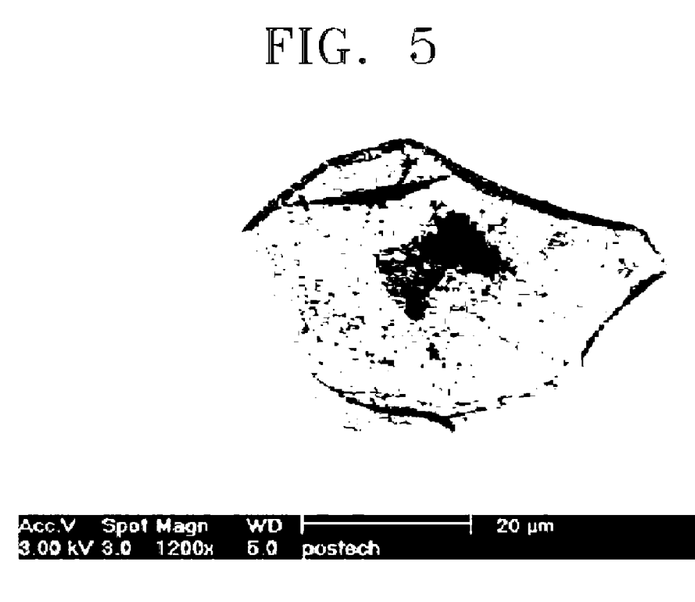
FIG. 5 is a SEM image of an ultrathin polymer film obtained using allyloxycucurbit[6]uril according to Example 3 of the present invention.

A 1N sodium hydroxide solution was dropwise added onto the substrate to separate an ultrathin polymer film formed on the substrate. The ultrathin polymer film was identified using an optical microscope and a scanning electron microscope (see FIG. 5).

As described above, an ultrathin polymer film according to the present invention is obtained by homopolymerization or copolymerization of a cucurbituril derivative with an organic monomer. The ultrathin polymer film has a thickness of 10 nm or less and can retain its film shape even after being separated from a substrate. Therefore, the ultrathin polymer film can be used in various fields.

What is claimed is:

1. A polymer film obtained by polymerization of a cucurbituril derivative represented by the following formula 1:

(1)

wherein X is O, S, or NH;

$A_1$ and $A_2$ are each independently OR, SR, or NHR where R is an unsubstituted or substituted alkenyl group of C2-C20 with an unsaturated bond end; and n is an integer from 4 to 20, and wherein the C=X group of the cucurbituril derivative binds with Y of a substrate represented by the following formula 2:

(2)

wherein M is Au, Ag, $SiO_2$, or SiOH;

X' is each independently S, $(CH_3O)_3$—Si—, $(CH_3CH_2)_3$—Si—, $SO_2^-$, or $CO_2^-$; and

Y is each independently an alkyl group of C2-C30 end-substituted by —$N^+(R')(R'')(R''')$ or —$N(R')(R'')$ where R', R'', and R''' are each independently hydrogen or an alkyl group of C1-C20.

2. The polymer film of claim 1, wherein in the cucurbituril derivative, X is NH, $A_1$ and $A_2$ are each an allyloxy group, and n is 6.

3. The polymer film of claim 1, which has a thickness of 10 nm or less.

4. The polymer film of claim 1, wherein the polymer film is separable from the substrate while maintaining retaining a film shape.

5. A polymer film obtained by copolymerization of a cucurbituril derivative represented by the following formula 1 and an organic monomer with a substituted or unsubstituted alkenyl group of C3-C30:

(1)

wherein X is O, S, or NH;

$A_1$ and $A_2$ are each independently OR, SR, or NHR where R is an unsubstituted or substituted alkenyl group of C2-C20 with an unsaturated bond end; and n is an integer from 4 to 20, and wherein the C=X group of the cucurbituril derivative binds with Y of a substrate represented by the following formula 2:

(2)

wherein M is Au, Ag, $SiO_2$, or SiOH;

X' is each independently S, $(CH_3O)_3$—Si—, $(CH_2CH_2)_3$—Si—, $SO_2^-$, or $CO_2^-$; and

Y is each independently an alkyl group of C2-C30 end-substituted by —$N^+(R')(R'')(R''')$ or —$N(R')(R'')$ where R', R'', and R''' are each independently hydrogen or an alkyl group of C1-C20.

6. The polymer film of claim 5, wherein the organic monomer is used in an amount of 0.01 to 1,000 moles based on 1 mole of the cucurbituril derivative of the formula 1.

7. The polymer film of claim 5, wherein the organic monomer is styrene, acrylic acid, methacrylic acid, vinylpyrrolidinone, alkyl acrylate, divinylbenzene, acrylamide, a mixture or combination thereof.

8. The polymer film of claim 5, wherein the polymer film is separable from the substrate while maintaining a film shape.

9. A method of forming a polymer film, comprising:
(a) dissolving a cucurbituril derivative represented by the following formula 1 in an organic solvent to prepare a solution;
(b) immersing a substrate with a self-assembled layer in the solution; and
(c) polymerizing the resultant obtained by the step (b),

(1)

wherein X is O, S, or NH;

$A_1$ and $A_2$ are each independently OR, SR, or NHR where R is an unsubstituted or substituted alkenyl group of C2-C20 with an unsaturated bond end; and n is an integer from 4 to 20, and wherein the substrate with the self-assembled layer is represented by the following formula 2:

(2)

wherein M is Au, Ag, $SiO_2$, or SiOH;

X' is each independently S, $(CH_3O)_3$—Si—, $(CH_3CH_2)_3$—Si—, $SO_2^-$, or $CO_2^-$; and Y is each independently an alkyl group of C2-C30 end-substituted by —$N^+(R')(R'')(R''')$ or —$N(R')(R'')$ where R', R'', and R''' are each independently hydrogen or an alkyl group of C1-C20.

10. The method of claim 9, further comprising immersing the substrate in a solution obtained by dissolving an organic monomer with a substituted or unsubstituted alkenyl group of C3-C30 in an organic solvent before (c).

11. The method of claim 10, wherein the organic monomer is used in an amount of 0.01 to 1,000 moles based on 1 mole of the cucurbituril derivative of the formula 1.

12. The method of claim 10, wherein the organic solvent is at least one selected from the group consisting of chloroform and acetonitrile.

13. The method of claim 9, wherein (c) is performed in the presence of a polymerization catalyst.

14. The method of claim 13, wherein the polymerization catalyst is at least one selected from the group consisting of a Grubbs catalyst and a radical initiator.

15. The method of claim 14, wherein the radical initiator is at least one selected from the group consisting of AIBN, $K_2S_2O_8$, $(NH_4)_2S_2O_8$, and benzoyl peroxide.

16. The method of claim 9, wherein the organic solvent is at least one selected from the group consisting of chloroform, dimethylsulfoxide, methanol, and acetonitrile.

17. The method of claim 9, wherein in the formula 2, M is Au, X' is S, and Y is $-CH_2CH_2NH_4^+$ or $-CH_2CH_2CH_2NH_4^+$.

18. The method of claim 9, wherein the polymer film is separable from the substrate while maintaining a film shape.

* * * * *